United States Patent
Boyles

[15] 3,637,053
[45] Jan. 25, 1972

[54] DISC BRAKE APPARATUS

[72] Inventor: Elmo N. Boyles, Orange County, Fla.
[73] Assignee: Disco Industries, Inc.
[22] Filed: Mar. 30, 1970
[21] Appl. No.: 23,808

[52] U.S. Cl..........................188/71.1, 188/72.5, 188/73.2, 188/264 AA, 192/70.19, 192/85 A
[51] Int. Cl......................................................F16d 55/228
[58] Field of Search..................188/71.1, 72.4, 72.5, 73.1, 188/73.2, 73.3, 264 AA; 192/70.19, 70.20, 85 A; 308/176

[56] References Cited

UNITED STATES PATENTS

| | | | |
|---|---|---|---|
| 2,875,857 | 3/1959 | Chapin | 188/73.2 X |
| 3,348,636 | 10/1967 | Boyles | 188/72.5 X |
| 2,269,254 | 1/1942 | Cribb | 308/6 B |
| 2,225,929 | 12/1940 | Sarazin | 308/6 B X |

Primary Examiner—George E. A. Halvosa
Attorney—Duckworth and Hobby

[57] ABSTRACT

A vehicle brake apparatus for attachment to the axle of a vehicle, has rotatable disc attached so as to rotate with the wheel of a vehicle and having free-floating pistons adapted to slide in cylinder bores of cylinders attached to the axle of the vehicle, and a telescoping brakeshoe actuated in one direction by the free-floating pistons whereby pneumatic or hydraulic pressure on the cylinder will move the piston telescoping the brakeshoe and brake lining into frictional engagement with the disc. The telescoping brakeshoe has bearings to maintain the telescoping portion in alignment and may have segmented portions for cooling and a spring return.

12 Claims, 9 Drawing Figures

ELMO N. BOYLES
INVENTOR.

BY Duckworth & Hobby
Attorneys

ELMO N. BOYLES
INVENTOR.

BY Duckworth & Hobby

Attorneys

ELMER N. BOYLES
INVENTOR.

BY Duckworth & Hobby

Attorneys

ELMO N. BOYLES
INVENTOR

BY Duckworth & Hobby

Attorneys

DISC BRAKE APPARATUS

BACKGROUND OF THE INVENTION

The present invention relates to vehicle brakes and more particularly to an improved vehicle brake assembly of the disc type. In the past it has been common to have vehicles such as motor vehicles fitted with shoe-type brakes which generally are internally expanding and hydraulically operated. However, in recent years disc-type brakes have become increasingly more common because of the limitations of the shoe-type brakes. Disc brakes have generally been of the partial disc type in which as annular brake disc is attached to the rotating wheel and is gripped by pincers having circular or kidney-shaped brake pads with friction linings to frictionally engage the disc to retard the rotation of the wheel. The large area of the disc has generally provided good results because of the good dissipation of heat generated by the brake thus improving the fade characteristics of the brakes. Another type of disc brake is referred to as the full disc or enclosed disc brake in which friction linings are attached to a shoe which may completely or partially encircle the axle parallel to the disc. In this type of disc brake the friction pads may be pressed against either side of the disc or alternatively can be pushing outward against the discs built into the brake housing, or the like.

To overcome the problem of chatter in partial disc brakes, some manufacturers have gone to what is known as a floating caliper disc brake and which has a free-floating caliper to prevent the brake chatter. Many variations of these prior art brake devices have been taught in the past. One such prior art disc brake is taught in U.S. Pat. No. 3,348,636 issued Oct. 24, 1967 for a "Guide Means For Disc Brake Friction Pads" to the present inventor and of which the present invention is an improvement on.

This previous invention provided a vehicle brake assembly consisting of a friction brake disc secured on a vehicle wheel, an annular housing secured on the vehicle frame and surrounding the brake disc, pairs of opposite brakeshoes in the housing located on opposite sides of the disc, and radially extending exposed hydraulic cylinder blocks carried by the housing on opposite sides of the brake disc, the blocks containing pistons drivingly connected to the brakeshoes. The brakeshoes are provided at their ends with peripherally grooved guide rollers engaged with transversely extending guide rods secured in the housing to guide and support the shoes as they move toward and away from the brake disc.

One object of the present invention is to provide an improved disc brake assembly which is relatively simple in construction and which has a high heat-dissipating capacity by providing air-cooled segments forming a part of the brakeshoe.

Another object of the present invention is to provide an improved disc brake assembly which may be manufactured relatively inexpensively because of the few components involved and which is rugged in construction and resistant to wear while being relatively compact in size and providing a novel telescoping brakeshoe actuated by free floating pistons and being adapted to absorb substantial torque while maintaining the alignment of the brakeshoes.

SUMMARY OF THE INVENTION

The present invention provides for a disc brake apparatus for vehicles and especially motor vehicles such as trucks and automobiles, and is attached to the axle of such vehicle which axle having a wheel rotatably attached thereto by means of a hub and adapted to rotate thereon and a rotatable disc fixedly attached to the wheel for rotation therewith. A cylinder body is attached to the axle in a fixed manner and has four bores therein— two bores on each side of the rotating disc. Each bore has a free-floating piston located in the bore for sliding back and forth in the cylinder bore. The brakeshoe is fitted over the cylinder means in a manner to telescope in and out parallel to the bore and piston so that when the pneumatically or hydraulically actuated pistons are actuated toward the disc, it will cause the telescoping brakeshoe having brake linings thereon to frictionally engage the rotating disc providing a braking action. The piston advantageously does not have to be connected to the brakeshoe and when the fluid pressures are released from the piston, the springs may be utilized to withdraw the brakeshoe from the frictional engagement with the disc. The telescoping brakeshoe is held in alignment by bearings between the cylinder and the telescoping portion of the brakeshoe resisting any rotational torque applied between the brakeshoe and the cylinder. It is also intended that metallic linings will be used for a more rapid dissipation of heat, and it is also suggested that spaced segmented brakeshoes may be used as well as spaced brake linings to provide additional cooling from the surrounding air to the brakeshoe and lining.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
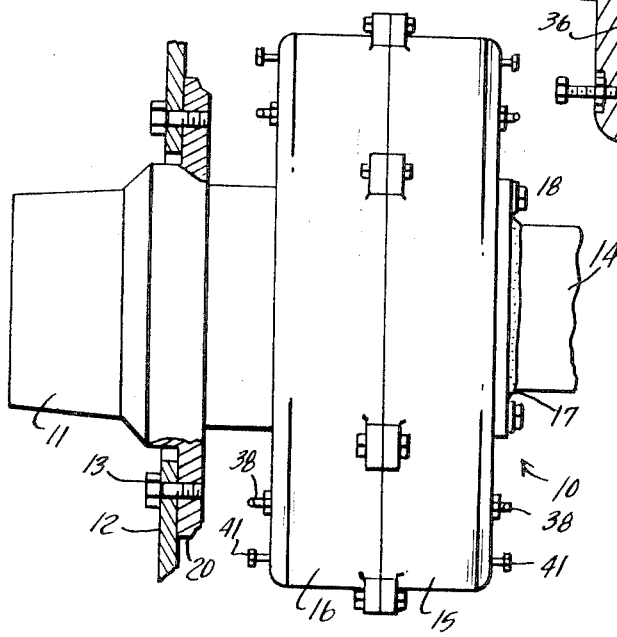
FIG. 1 is the side view of the wheel hub of a vehicle equipped with an improved disc brake assembly constructed in accordance with the present invention.

Referring to the drawings, FIG. 1 tends to generally designate a typical wheel brake assembly constructed in accordance with the present invention and having a hub 11 with a wheel 12 attached thereto by bolts 13 and axle tube 14 may be fixedly attached to a vehicle such as an automobile and is connected to the hub and wheel as will be described in more detail in FIG. 2. The brake assembly has an inner housing 15 and an outer housing 16 for housing the brake assembly and is fixedly attached to the axle by flange 17 which has bolts 18 for attaching the housing assembly to the axle 14.

Figure 2:
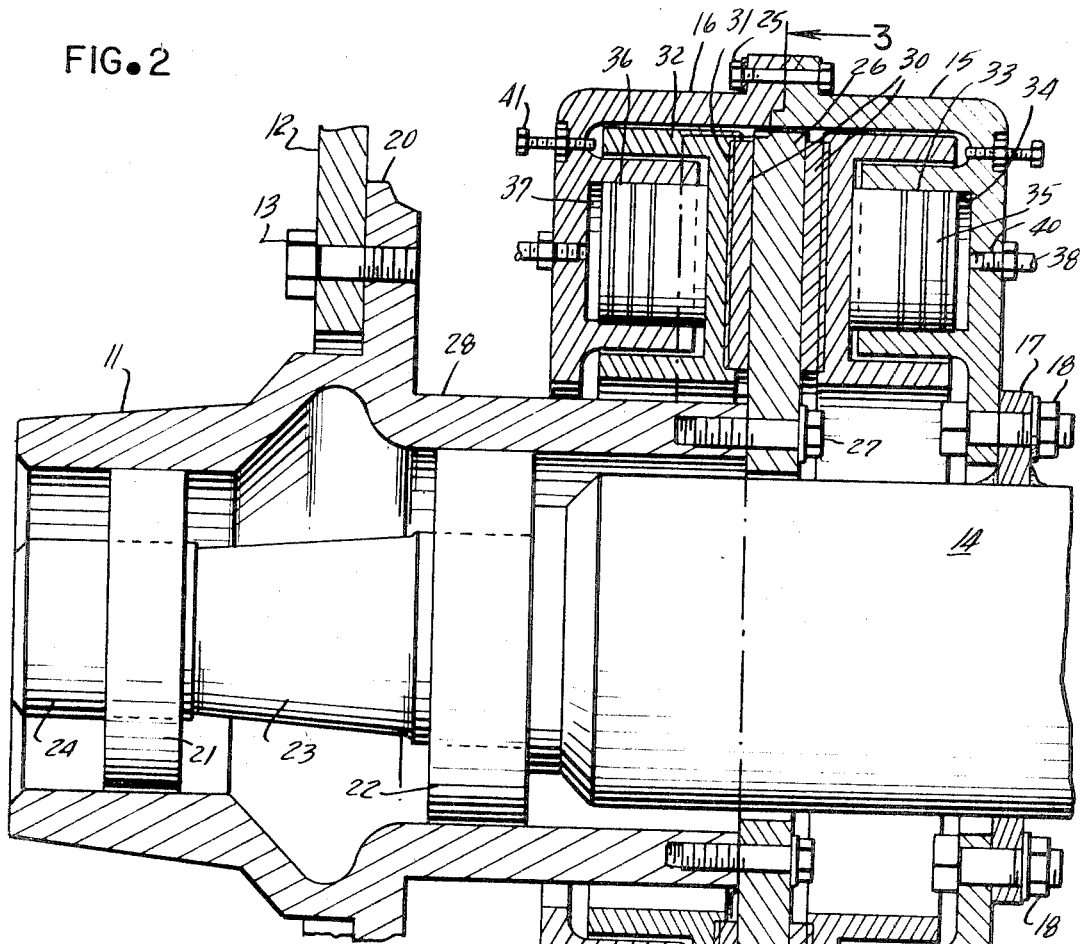
FIG. 2 is an enlarged cross-sectional view of the embodiment of FIG. 1.

Referring now to FIG. 2, the wheel 12 can be seen attached by bolt 13 to a flange 20 forming a part of the hub 11. Hub 11 is rotatably attached to the axle 14 and rides on outer bearings 21 and inner bearings 22. The axle 14 has a spindle 23 or narrowing portion on the end and an end portion 24. The brake assembly 10, inner housing 15 is bolted by bolt 18 to the flange 17 which in turn is welded to the axle 14. The outer housing 16 is bolted to the inner housing 15 by bolts 25. A brake disc 26 is located inside the housing 15 and 16 and is an annular disc surrounding the axle 14 and bolted by bolts 27 to the hub skirt 28 of the hub 11. Thus the disc 26 will rotate with the hub 11 and wheel 12 independent of the fixed axle 14 and brake housing 15 and 16. A pair of brake linings 30 are located on either side of the brake disc 26 and each attached to a small steelplate 31 which is in turn attached to brakeshoes 32 so that in order to stop the rotating wheel 12 it is necessary to apply pressure from the brakeshoe against the brake linings to frictionally engage the brake linings 30 with the brake disc 26 resisting the rotation of the wheel. In order to accomplish this, the brakeshoe 32 is made to telescope over cylinders 33 having bore 34 therein so that the brakeshoe can slide back and forth on the cylinder 33, and in each bore 34 a piston 35 is located which is free floating, does not have to be fixedly connected to anything even though it should be clear that it could be connected to the brakeshoe 32 without departing from the spirit and scope of the present invention. Each piston 35 has piston rings 36, in this case shown as three rings for each piston, for maintaining a generally tight seal with the bore 34 providing a fluidtight chamber 37. Tubes 38 are connected to each cylinder chamber 37 at 40 so that pressure from a fluid such as air pressure in a pneumatic system or brake fluid in a hydraulic system can be applied in the usual manner as desired to expand 37 by forcing piston 35 to slide toward the brake disc 26, thus forcing the brakeshoes 32 to telescope on the cylinders 33 and the brake linings 30 to be pushed into engagement with the brake disc 26 braking the rotational movement of wheel hub 11 and wheel 12. Each telescoping brakeshoe has at least one brake adjustment bolt 41 which may be screwed in and out to adjust the telescoping of the brakeshoe 32.

It should already be clear to those skilled in the art that a brake assembly has been described for braking a vehicle wheel such as the wheel of an automobile or truck-trailer or other vehicles requiring a nonfade brake. Portions of this brake assembly will be described in more detail in the description of the following figures.

Figure 3:
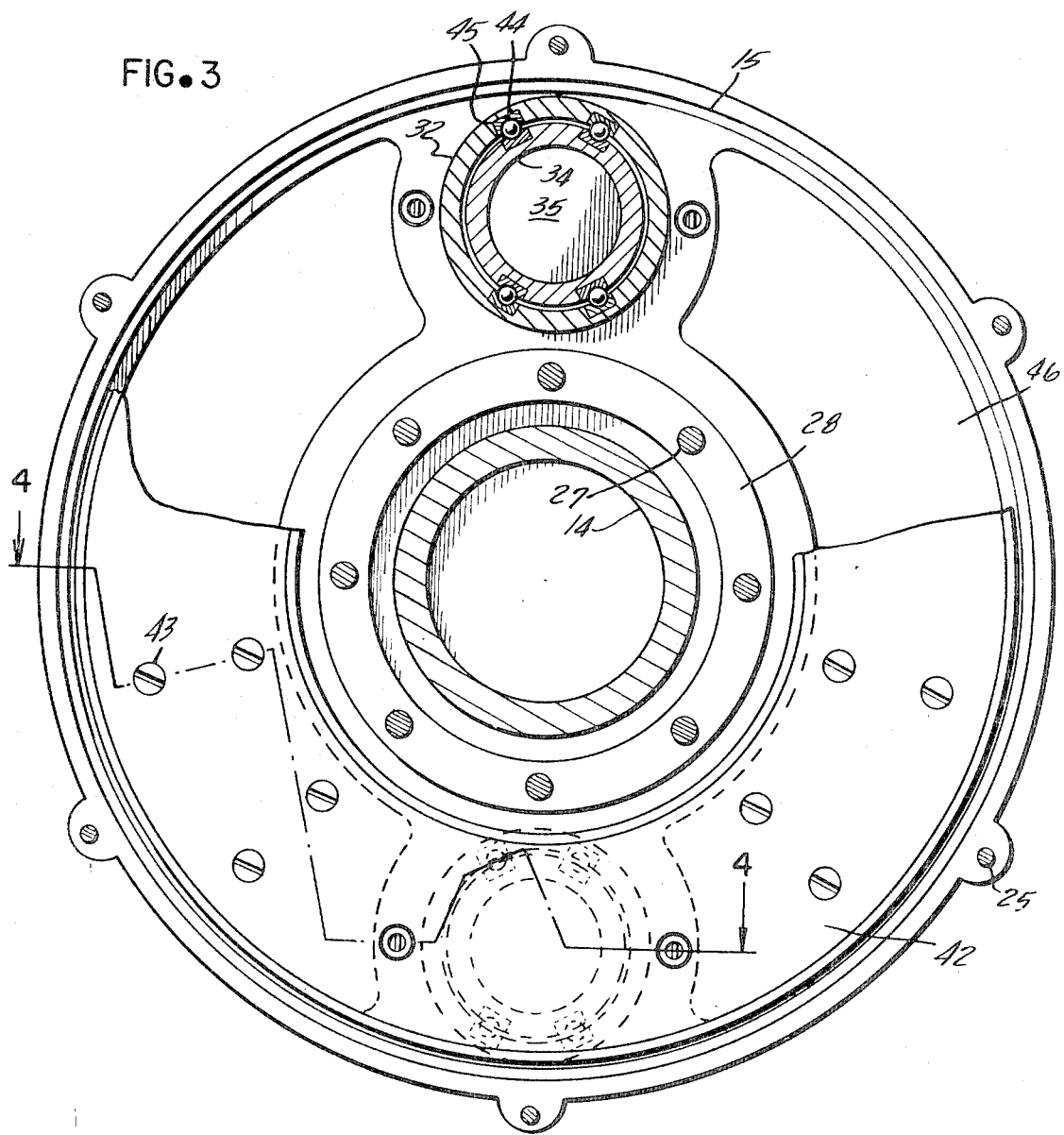
FIG. 3 is a view taken along line 3—3 of FIG. 2.

Referring now more specifically to FIG. 3, a view can be seen having an axle 14, hub skirt 28, and bolt 27 for attaching the brake disc thereto. The inner housing 15 can be seen bolted at 25 to the outer housing in the back of the annular disc portion of the brakeshoe 42, which forms a part of the telescoping portion of the brakeshoe 32, can be seen having screws 43 for attaching the brake lining to the brakeshoe 42. Piston 35 sliding in the bore 34 of cylinder 33 can be seen with the telescoping portion of the brakeshoe 32. It can also be seen at this point that ball bearings 44 ride between cylinder 33 in a telescoping portion of the brakeshoe 32 and ride in a bearing guide 45. Four sets of bearings 44 riding in guide 45 are illustrated between cylinder 33 and the telescoping brakeshoe portion 32. These bearings help maintain the brakeshoe in alignment and resist the shear during the braking action caused by the cylinders 33 and brakeshoe 32 endeavoring to rotate relative to each other. Thus it can be seen that the piston 35 is allowed to be completely free-floating maintaining the brakeshoe 42 telescoping portion 32 free from any fixed connections between the piston 35 and the cylinder 32, which cylinders form a part of the housing 15. The housing 15 has an open section in the housing 46 for allowing air to penetrate into the braking area for rapid cooling and it is anticipated that metallic-type brake lining will be used for rapid heat dissipation away from the disc and brake linings in order to provide better cooling of the brake system.

Figure 4:
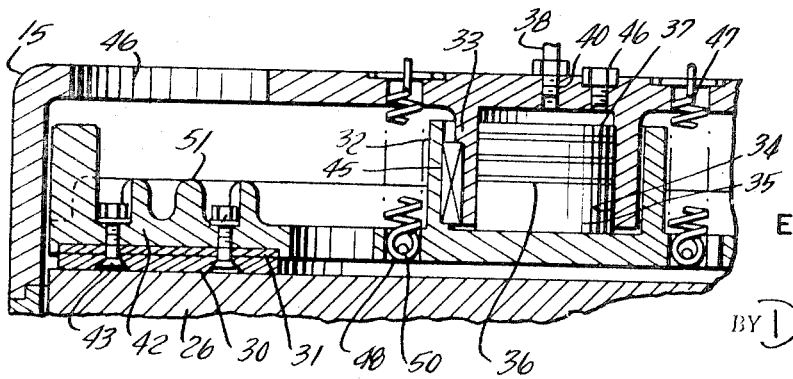
FIG. 4 is a view taken along line 4—4 of FIG. 3.

Referring now to FIG. 4, a portion of the inner housing 15 can be seen having open sections 46 with the braking disc 26 located inside, pistons 35 having piston rings 36 ride in the bore 34, of cylinder 33 forming a generally fluidtight chamber 37. The bearing assembly 45 rides between the telescoping portion 32 of the braking shoe and the cylinder outer walls 33. An inlet tube 38 is connected at 40 to the chamber 37 and a bleeder valve 46 is provided connected to chamber 37 for bleeding the brakes as desired. A retract spring 47 has a loop 48 in one end for catching a protruding portion 50 of the brakeshoe to provide retraction of the brakeshoe and to maintain generally a force on the brakeshoe and lining pulling them away from the disc 26. The pistons 35 upon the expansion of chamber 37 will drive the brakeshoes against the spring 47 into engagement of the brake lining disc and upon contraction of the chamber 37 the spring 47 will withdraw the brakeshoes and linings from the disc 26. Brake lining bolts 43 can be seen for bolting the brake linings 30 to the brakeshoe 42 and brakeshoe cooling fins 51 can be seen on the back portion of the brakeshoe for assisting in cooling of the hear being conducted through the metallic brake linings 30 through the steelplate 31 and the brakeshoes 42. It is contemplated by the use of these metallic materials that a more rapid dissipation of heat will be conducted through the materials and that the segments of the brakeshoe fins can be utilized for more readily dissipating this heat into the air, especially in view of the openings in the housing 15 to allow a better flow of air into the braking assembly. It is also contemplated that braking shoes could be segmented by having a segment opening all the way through the brakeshoe or by having the segment shaped so as to more rapidly move the air through the brake assembly such as having an impeller-shaped cooling fin to more rapidly move air and even by having segments pass through the brake linings, without departing from the spirit and scope of the present invention.

Figure 5:
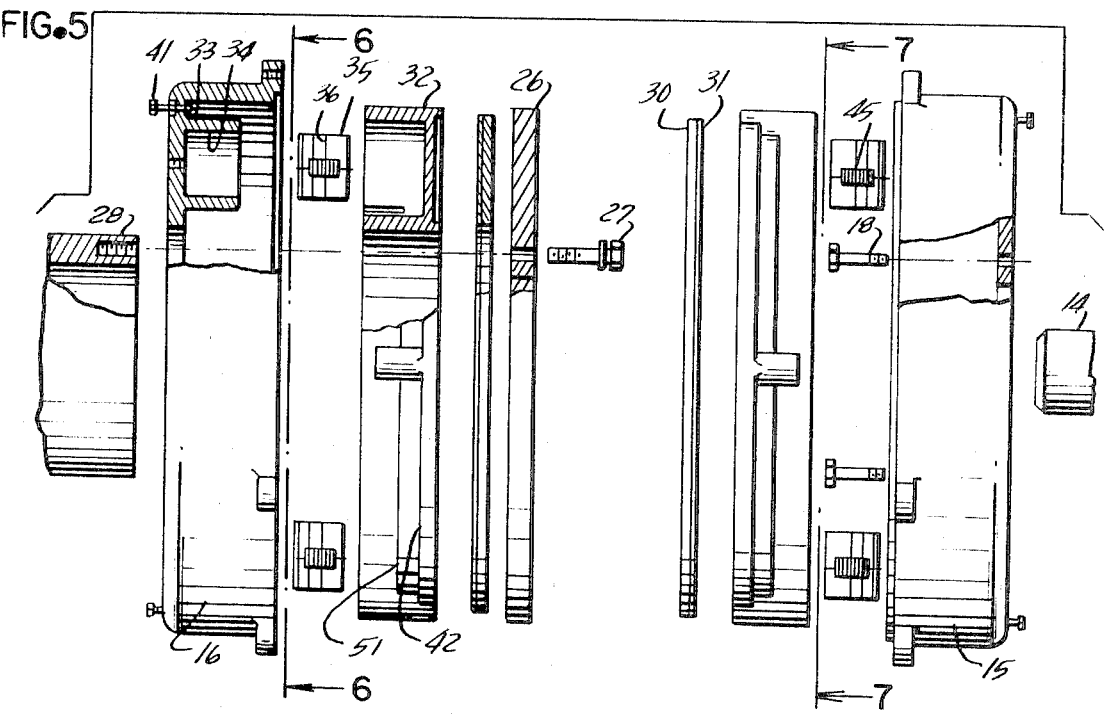
FIG. 5 is an exploded view of the embodiment of FIGS. 1–4.

Turning now to FIG. 5, an exploded view is seen having the axle 14, the inner housing 15 and outer housing 16, the hub skirt 28 with bolts 27 for holding the disc 26 thereto and the brake linings 30 connected to the steelplate 31 for engaging the disc 26. Brakeshoe 42 with its telescoping cylindrical portions 32 formed therein can be seen separated from cylinder 33 having a bore 34 for pistons 35 to fit into, with rings 36 making an airtight seal. Brake adjustment bolt 41 is also shown, as well as the bolt 18 for attaching the housing 15 to the flange of the axle 14. Linear bearing assembly 45, piston 35, and the brakeshoes 42 having segments 51 forming a part thereof can also be viewed.

Figure 6:
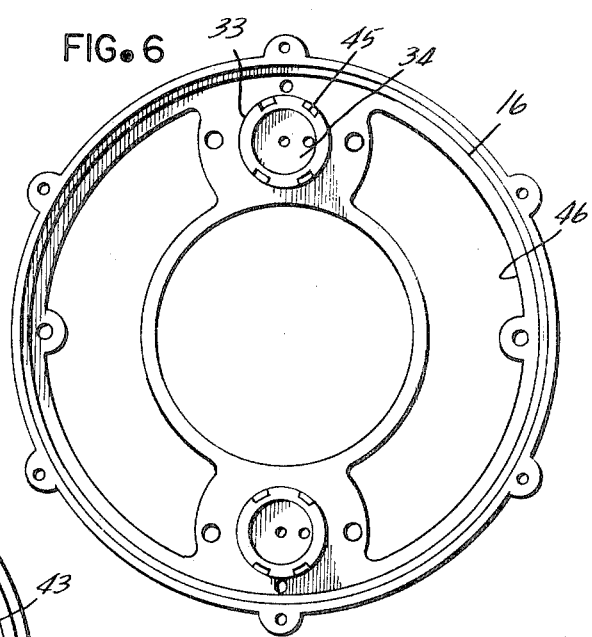
FIG. 6 is a view taken along line 6—6 of FIG. 5.

FIG. 6 shows a view taken along line 6—6 of FIG. 5 and more clearly shows the bore 34 of the cylinder 33 and the location of the bearing assembly 45 in the outer housing 16. As can be seen, outer housing 16 has openings 46 for circulation of air. That is, the cup-shaped housing 33 is cast with the brake housing 16 to eliminate additional castings for a cylinder assembly. A pair of these castings are used in each half of the housing thus four cylinders and pistons could be used—two on each side of the disc.

Figure 7:
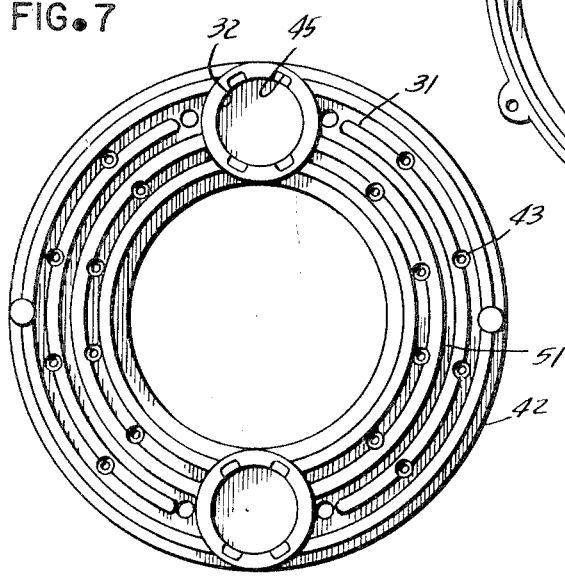
FIG. 7 is a view taken along line 7—7 of FIG. 5.

FIG. 7 is taken along lines 7—7 and shows the brakeshoe arrangement having the telescoping cylindrical portion 32 of brakeshoe 42 having second portion of the bearing assembly 45 and segmented fins 51 for more rapid cooling of the brakeshoe, along with bolt 43 for attaching the brake linings 30.

Figure 8:
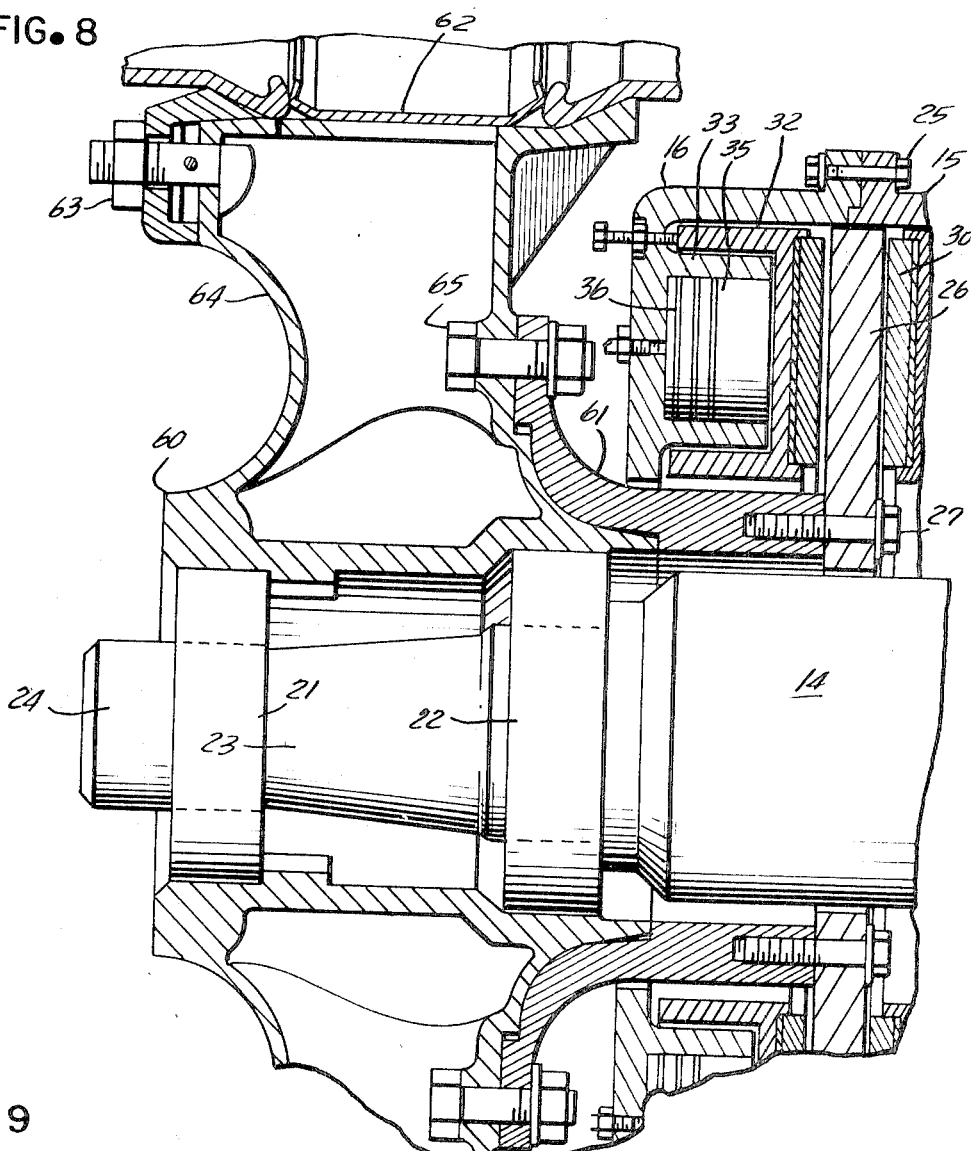
FIG. 8 shows cutaway cross-sectional view of a portion of the wheel hub with a wheel brake assembly in accordance with the present invention.

FIG. 8 illustrates the present invention on a different type of wheel assembly still having an axle 14 with an axle spindle, or reduced axle journal portion 23 and outer bearings 21, inner bearings 22, and outer axle portion 24. Similarly, the brake assembly has a hub 60 having a spoke wheel adapter 61 with bolts 27 attaching the disc 26 to the spoke wheel adapter 61. Assembly also has the brake lining 30, brakeshoe cylinder portions 32, housing 15 and 16 bolted together by bolts 25 and having cylinders 33 with pistons 35 in a bore thereof, piston rings 36 for operation in the same manner as has been previously described. This type of wheel assembly is generally referred to as the Erie spoke wheel and has a wheel rim 62 connected by bolt 63 to the wheel spoke 64 of the spoke wheel hub 60. The adapter 61 is bolted to the wheel by bolt 65 so that this type of wheel can be readily adapted using the adapter 61 for use with the present brake assembly without other alterations.

Figure 9:
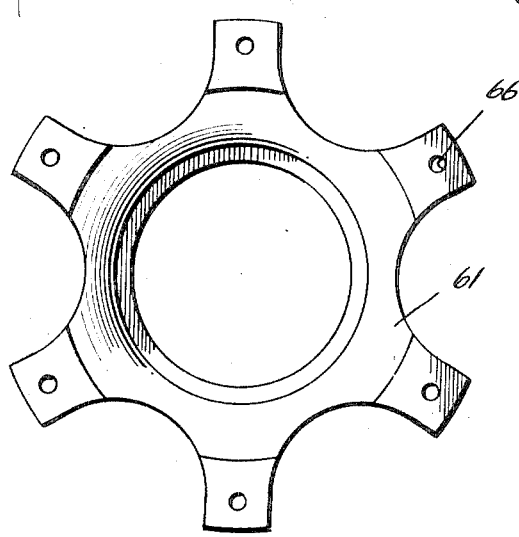
FIG. 9 illustrates an adapter for a spoked wheel for use with the present invention.

FIG. 9 more clearly illustrates the adapter 61 for the spoke wheel having bolt holes 66 for bolts 65.

It will of course be clear at this time that the present braking assembly can be readily adapted for other types of vehicles, wheels and wheel hubs without departing from the spirit and scope of the invention and may also be used on automobiles, trucks and any other vehicles on which a rotating wheel is utilized. It may be pneumatic, or hydraulically operated without departing from the spirit and scope of the invention. Accordingly, the present invention is not to be construed as limited to the particular forms disclosed herein, since these are to be regarded as illustrative rather than restrictive.

I claim:

1. A disc brake apparatus for a vehicle comprising in combination:
   a. axle means attached to a vehicle;
   b. rotatable disc means adapted to be fixedly attached to a wheel for rotation therewith;
   c. a plurality of cylinders attached to said axle means and each said cylinder having cylinder walls with a cylindrical bore therein on at least one side of said disc means;

d. a free-floating cylindrical piston located in each said bore of said cylinders for sliding therein;
e. telescoping brakeshoe means having a telescoping portion movably fitted over said cylinder walls and adapted to be moved in one direction by movement of said free-floating piston in said one direction;
f. a plurality of bearings located between the exterior of said walls and the interior of said telescoping portion of said brakeshoe means to said bearings being adapted to resist rotation between said telescoping brakeshoe means and said cylinders;
g. each said bearing being fitted in a groove located in said exterior cylinder wall and in a groove located in each said telescoping portion of said brakeshoe means; and
h. brake lining means attached to said brakeshoe means and adapted to frictionally engage said disc means whereby movement of said piston means in said cylinder bores will telescope said brakeshoe means engaging said brake lining means with said disc means.

2. The apparatus in accordance with claim 1 in which said cylinders include two pairs of cylinders, one pair on each side of said disc means, and said pistons include two pairs of pistons, one pair on each side of said disc means.

3. The apparatus in accordance with claim 2 in which the brake lining means includes one lining on either side of said disc means, each said lining being an annular plate lining adapted for a 360° engagement with said disc means.

4. The apparatus in accordance with claim 3 but including a spring-actuated return means for applying a force to said brakeshoe means opposite to that applied by said activation of said piston means.

5. The apparatus in accordance with claim 4 in which said bearing means includes linear-type bearings.

6. The apparatus in accordance with claim 5 in which said brake apparatus is pneumatically operated to expand a chamber in said cylinder means, to slide said piston means therein to activate said brakeshoe means for frictional engagement of said brake lining means with said disc means.

7. The apparatus in accordance with claim 6 in which said brake lining means includes a pair of metallic composite brake linings.

8. The apparatus in accordance with claim 7 in which said brakeshoe means have spaced cooling fins.

9. The apparatus in accordance with claim 8 in which said spaced cooling fins form an impeller for increasing the movement of cooling air around said brake apparatus.

11. The apparatus in accordance with claim 8 in which said brake lining includes spaced segment therein.

10. The apparatus in accordance with claim 8 but including a housing means covering said brake apparatus, said housing having openings for the passage of cooling air.

12. The apparatus in accordance with claim 11 in which said cylinders and said housing are formed together.

* * * * *

UNITED STATES PATENT OFFICE
CERTIFICATE OF CORRECTION

Patent No. 3,637,053    Dated January 25, 1972

Inventor(s) Elmo N. Boyles

It is certified that error appears in the above-identified patent and that said Letters Patent are hereby corrected as shown below:

On the cover sheet [72], "Orange County, Fla." should read -- 540 E. Horatio Ave., Maitland, Fla. --

Signed and sealed this 7th day of November 1972.

(SEAL)
Attest:

EDWARD M. FLETCHER, JR.
Attesting Officer

ROBERT GOTTSCHALK
Commissioner of Patents